United States Patent
Kobayashi et al.

(10) Patent No.: US 10,576,709 B2
(45) Date of Patent: Mar. 3, 2020

(54) RESIN COMPOSITE

(71) Applicant: SEKISUI PLASTICS CO., LTD., Osaka (JP)

(72) Inventors: Hironori Kobayashi, Nara (JP); Haruhiko Matsuura, Nara (JP); Yusuke Kuwabara, Nara (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 48 days.

(21) Appl. No.: 15/500,735

(22) PCT Filed: Sep. 30, 2015

(86) PCT No.: PCT/JP2015/077802
§ 371 (c)(1),
(2) Date: Jan. 31, 2017

(87) PCT Pub. No.: WO2016/052645
PCT Pub. Date: Apr. 7, 2016

(65) Prior Publication Data
US 2017/0217127 A1    Aug. 3, 2017

(30) Foreign Application Priority Data
Sep. 30, 2014    (JP) .................. 2014-200862

(51) Int. Cl.
*B32B 5/18*    (2006.01)
*B32B 5/24*    (2006.01)
(Continued)

(52) U.S. Cl.
CPC .......... *B32B 5/18* (2013.01); *B29C 43/12* (2013.01); *B29C 43/18* (2013.01); *B29C 43/34* (2013.01); *B32B 5/24* (2013.01); *B32B 27/34* (2013.01); *B32B 37/10* (2013.01); *C08J 5/04* (2013.01); *C08J 5/24* (2013.01); *C08J 9/04* (2013.01); *C08J 9/36* (2013.01); *C08J 9/365* (2013.01);
(Continued)

(58) Field of Classification Search
CPC .............. B32B 5/18; B32B 5/24; B32B 27/34
See application file for complete search history.

(56) References Cited

U.S. PATENT DOCUMENTS 5,149,574 A    9/1992    Gross et al.
7,631,723 B2    12/2009    Ono et al.
(Continued)

FOREIGN PATENT DOCUMENTS

CN    1871126 A    11/2006
EP    0438766 A2    7/1991
(Continued)

OTHER PUBLICATIONS

Taiwanese Office Action issued with respect to Application No. 104132057, dated Feb. 22, 2017.
(Continued)

*Primary Examiner* — Hai Vo
(74) *Attorney, Agent, or Firm* — Greenblum & Bernstein, P.L.C.

(57) ABSTRACT

The resin composite of the present invention has a polyamide-based resin expanded sheet, and a fiber-reinforced resin layer integrally laminated on a surface of the polyamide-based resin expanded sheet.

5 Claims, 3 Drawing Sheets

(51) Int. Cl.
<table>
<tr><td>B29C 43/12</td><td>(2006.01)</td></tr>
<tr><td>B29C 43/18</td><td>(2006.01)</td></tr>
<tr><td>B32B 27/34</td><td>(2006.01)</td></tr>
<tr><td>C08J 5/04</td><td>(2006.01)</td></tr>
<tr><td>B29C 43/34</td><td>(2006.01)</td></tr>
<tr><td>C08J 9/04</td><td>(2006.01)</td></tr>
<tr><td>C08J 9/36</td><td>(2006.01)</td></tr>
<tr><td>B32B 37/10</td><td>(2006.01)</td></tr>
<tr><td>C08J 5/24</td><td>(2006.01)</td></tr>
<tr><td>B29K 105/08</td><td>(2006.01)</td></tr>
<tr><td>B29K 105/04</td><td>(2006.01)</td></tr>
<tr><td>B29K 423/00</td><td>(2006.01)</td></tr>
<tr><td>B29K 505/00</td><td>(2006.01)</td></tr>
<tr><td>B29K 509/08</td><td>(2006.01)</td></tr>
<tr><td>B29L 9/00</td><td>(2006.01)</td></tr>
<tr><td>B29K 509/00</td><td>(2006.01)</td></tr>
<tr><td>B29C 44/50</td><td>(2006.01)</td></tr>
<tr><td>B29K 507/04</td><td>(2006.01)</td></tr>
<tr><td>B29K 77/00</td><td>(2006.01)</td></tr>
</table>

(52) U.S. Cl.
CPC ........ *B29C 44/505* (2016.11); *B29K 2077/00* (2013.01); *B29K 2105/041* (2013.01); *B29K 2105/0854* (2013.01); *B29K 2423/06* (2013.01); *B29K 2505/00* (2013.01); *B29K 2507/04* (2013.01); *B29K 2509/08* (2013.01); *B29K 2509/14* (2013.01); *B29K 2995/0063* (2013.01); *B29K 2995/0077* (2013.01); *B29K 2995/0097* (2013.01); *B29L 2009/00* (2013.01); *C08J 2363/00* (2013.01); *C08J 2377/02* (2013.01)

(56) References Cited

U.S. PATENT DOCUMENTS

| | | | |
|---|---|---|---|
| 2004/0112672 A1 | 6/2004 | Ono et al. | |
| 2006/0167124 A1* | 7/2006 | Bernard | C08G 18/281 |
| | | | 521/163 |
| 2007/0166526 A1 | 7/2007 | Myard et al. | |
| 2010/0025399 A1* | 2/2010 | Muhlhausen | B65D 23/12 |
| | | | 220/23.86 |
| 2010/0143661 A1 | 6/2010 | Warrick | |
| 2013/0017391 A1 | 1/2013 | Kato et al. | |
| 2013/0209784 A1* | 8/2013 | Nakagawa | C08L 77/00 |
| | | | 428/314.8 |
| 2014/0199515 A1 | 7/2014 | Oyabu | |

FOREIGN PATENT DOCUMENTS

| | | |
|---|---|---|
| JP | H04-288227 A | 10/1992 |
| JP | 2005-101889 A | 4/2005 |
| JP | 2005-313613 A | 11/2005 |
| JP | 2007-505772 A | 3/2007 |
| JP | 2008-207523 A | 9/2008 |
| JP | 2012-509443 A | 4/2012 |
| JP | 2014-208417 A | 11/2014 |
| KR | 2013-0009662 A | 1/2013 |
| WO | 2014/010106 A | 1/2014 |

OTHER PUBLICATIONS

Extended European Search Report for EP15847974.1, dated Jun. 20, 2018.
International Search Report issued with respect to Application No. PCT/JP2015/077802, dated Dec. 28, 2015.
International Preliminary Report on Patentability issued with respect to Application No. PCT/JP2015/077802, dated Apr. 4, 2017.
Korean Office Action issued with respect to Korean Application No. 2017-7004982, dated Mar. 9, 2018.
Japanese Office Action issued with respect to Japanese Application No. 2016-552132, dated Mar. 23, 2018.
Office Action issued in CN 201580045872.2, dated Nov. 27, 2018.
Wen, Bianying, "Polymer Materials and Processing Thereof" Mar. 2011, p. 149, China light Industry Press (w/ English-language translation).

* cited by examiner

RESIN COMPOSITE

CROSS-REFERENCE TO RELATED APPLICATIONS

The present application claims the priority of Japanese Patent Application No. 2014-200862, which is incorporated herein by reference.

TECHNICAL FIELD

The present invention relates to a resin composite.

BACKGROUND TECHNOLOGY

From a view point of energy saving, in recent years, in the field of automobiles, aircrafts, railway vehicles or the like, a trend of using a resin composite obtained by compounding a high strength material such as a fiber-reinforced resin material and a lightweight core material such as a resin expanded sheet in place of a metal material inferior in lightweight property has been enhanced (see the following Patent Document 1).

PRIOR ART DOCUMENTS

Patent Documents

Patent Document 1: Japanese Unexamined Patent Application, First Publication No. 2005-313613

SUMMARY OF THE INVENTION

Problem to be Solved by the Invention

Meanwhile, in Examples of Patent Document 1, a polypropylene expanded sheet or a polymethacrylimide expanded sheet is used in a core material.

The polypropylene expanded sheet has however a problem that heat resistance is insufficient, and the polymethacrylimide expanded sheet has a problem that impact resistance is low.

That is, the conventional resin composite has a problem to be solved that heat resistance and impact resistance are not sufficiently excellent.

Means for Solving the Problem

The present invention has been made for solving the above-mentioned problems, and provides a resin composite comprising a polyamide-based resin expanded sheet, and a fiber-reinforced resin layer laminated on a surface of the polyamide-based resin expanded sheet, wherein the fiber-reinforced resin layer and the polyamide-based resin expanded sheet are integrated with each other.

Effects of Invention

According to the present invention, impact resistance and heat resistance of a resin composite can be improved.

BEST MODE FOR CARRYING OUT THE INVENTION

Figure 1:
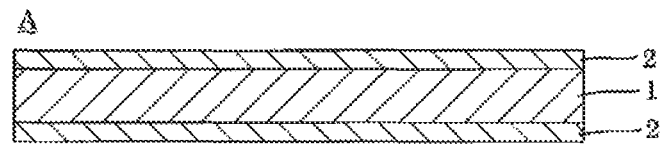
FIG. 1 is a schematic cross-sectional view showing one example of the resin composite of the present invention.

Embodiments of the present invention will be explained below by referring to the drawings.

A resin composite A of the present embodiment shown in FIG. 1 has a polyamide-based resin expanded sheet 1, and a fiber-reinforced resin layer 2 which is laminated on the polyamide-based resin expanded sheet 1 and integrated with the polyamide based resin expanded sheet 1. That is, the fiber-reinforced resin layer 2 adheres closely to a surface of the polyamide-based resin expanded sheet 1. In the resin composite A of the present embodiment, an applied impact force can be smoothly absorbed by the polyamide-based resin expanded sheet 1. In the resin composite A of the present embodiment, the polyamide-based resin expanded sheet 1 is not excessively deformed by an impact force. Since the fiber-reinforced resin layer 2 can be suppressed from generating a crack by an impact force, the resin composite A has excellent impact resistance. Besides, since the polyamide-based resin expanded sheet 1 is excellent in heat resistance, the resin composite A has excellent heat resistance.

The resin composite A will be explained in detail below.
(Polyamide-Based Resin Expanded Sheet 1)

Examples of a polyamide-based resin constituting the polyamide-based resin expanded sheet 1 include PA6, PA6.6, PA10, PA11, PA12, PA6,12, PA12,12, PA4,6. PA6,T. PA6,I, PA9,T, PA5M,T, and the like. The polyamide-based resin may be used alone, or two or more kinds thereof may be used concurrently. The polyamide-based resin may be, for example, a polycondensate of diamine, dicarboxylic acid, or ω-amino-ω' carboxylic acid. Alternatively, the polyamide-based resin may be a ring-opening polymer of cyclic lactam.

Examples of the diamine include ethylenediamine, trimethylenediamine, tetramethylenediamine, pentamethylenediamine, hexamethylenediamine, 1,7-diaminoheptane, 1,8-diaminooctane, 1,9-diaminononane, 1,10-diaminodecane, phenylenediamine, meta-xylylenediamine, and the like.

Examples of the dicarboxylic acid include glutaric acid, adipic acid, pimelic acid, suberic acid, azelaic acid, sebacic acid, nonanedicarboxylic acid, decanedicarboxylic acid, tetradecanedicarboxylic acid, octadecanedicarboxylic acid, fumaric acid, phthalic acid, xylenedicarboxylic acid, and the like.

Examples of the ω-amino-ω' carboxylic acid include 6-aminocaproic acid, 7-aminoheptanoic acid, 9-aminononanoic acid, 11-aminoundecanoic acid, 12-aminododecanoic acid, and the like.

Examples of the cyclic lactam include ε-caprolactam, ω-enatholactam, ω-lauryllactam, and the like.

From a view point of impact resistance and heat resistance, the content of the polyamide-based resin in the polyamide-based resin expanded sheet 1 is preferably 60% by mass or more and 100% by mass or less, more preferably 75% by mass or more and 100% by mass or less, and further preferably 85% by mass or more and 100% by mass or less.

The polyamide-based resin expanded sheet 1 may further contain a resin such as a polycarbonate resin, a modified polyphenylene ether-based resin, a polystyrene resin, and a thermoplastic polyester resin, in addition to the polyamide-based resin.

Examples of the polycarbonate resin include polymers obtained by a phosgene method of reacting a dihydroxydiaryl compound and phosgene, or a transesterification method of reacting a dihydroxydiaryl compound and carbonic ester such as diphenyl carbonate. Examples of a representative polycarbonate resin include polycarbonate resins produced from 2,2-bis(4-hydroxyphenyl)propane (bisphenol A).

Examples of the dihydroxydiaryl compound include, in addition to bisphenol A, bis(hydroxyaryl)alkanes such as bis(4-hydroxyphenyl)methane, 1,1-bis(4-hydroxyphenyl)ethane, 2,2-bis(4-hydroxyphenylbutane, 2,2-bis(4-hydroxyphenyl)octane, bis(4-hydroxyphenyl)phenylmethane, 2,2-bis(4-hydroxyphenyl-3-methylphenyl)propane, 1,1-bis(4-hydroxy-3-tertiarybutylphenyl)propane, 2,2-bis(4-hydroxy-3-bromophenyl)propane, 2,2-bis(4-hydroxy-3,5-dibromophenyl)propane, 2,2-bis(4-hydroxy-3,5-dichlorophenyl)propane; bis(hydroxyaryl)cycloalkanes such as 1,1-bis(4-hydroxyphenyl)cyclopentane and 1,1-bis(4-hydroxyphenyl)cyclohexane; dihydroxydiaryl ethers such as 4,4'-dihydroxydiphenyl ether and 4,4'-dihydroxy-3,3'-dimethyl diphenyl ether; dihydroxydiaryl sulfides such as 4,4'-dihydroxydiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; and the like.

Examples of the modified polyphenylene ether-based resin include a mixture of polyphenylene ether and a polystyrene-based resin, modified polyphenylene ether obtained by graft copolymerization of polyphenylene ether with a styrene-based monomer, a mixture of this modified polyphenylene ether and a polystyrene-based resin, a block copolymer obtained by oxidatively polymerizing a phenol-based monomer and a styrene-based monomer in the presence of a catalyst such as an amine complex of copper (II), a mixture of this block copolymer and a polystyrene-based resin, and the like. In addition, the modified polyphenylene ether-based resin may be used alone, or two or more kinds thereof may be used concurrently.

Examples of the thermoplastic polyester resin include high molecular weight linear polyesters obtained as a result of a condensation reaction of a dicarboxylic acid and a dihydric alcohol. Examples of the thermoplastic polyester resin include an aromatic polyester resin and an aliphatic polyester resin.

The aromatic polyester resin is a polyester containing an aromatic dicarboxylic acid component and a diol component, and examples thereof include polyethylene terephthalate, polypropylene terephthalate, polybutylene terephthalate, polycyclohexanedimethylene terephthalate, polyethylene naphthalate, polybutylene naphthalate, and the like. As the aromatic polyester resin, polyethylene terephthalate is preferable. In addition, the aromatic polyester resin may be used alone, or two or more kinds thereof may be used concurrently.

The aromatic polyester resin may contain, for example, a trivalent or higher polyvalent carboxylic acid such as a tricarboxylic acid such as trimellitic acid, a tetracarboxylic acid such as pyromellitic acid, and the like, or an anhydride thereof, in addition to the aromatic dicarboxylic acid component and the diol component. The aromatic polyester resin may contain, as a constituent, a trivalent or higher polyhydric alcohol such as a triol such as glycerin, a tetraol such as pentaerythritol, and the like.

As the aromatic polyester resin, a recycled material which was recovered and reproduced from a used PET bottle or the like can also be used. The aromatic polyester resin may be used by mixing with polycyclohexylenedimethylene terephthalate (PCT resin) or the like.

Examples of the aliphatic polyester resin include polylactic acid-based resins. As the polylactic acid-based resin, a resin in which lactic acid is polymerized with an ester bond can be used, and from a view point of commercial availability and impartation of expandability to polylactic acid-based resin particles, a copolymer of D-lactic acid (D isomer) and L-lactic acid (L isomer), a homopolymer of either of D-lactic acid or L-lactic acid, and a ring opening polymer of one or two or more lactides selected from the group consisting of D-lactide, L-lactide, and DL-lactide are preferable. In addition, the polylactic acid-based resin may be used alone, or two or more kinds thereof may be used concurrently.

The polylactic acid-based resin may contain, as a monomer component other than lactic acid, aliphatic hydroxycarboxylic acids such as glycolic acid, hydroxybutyric acid, hydroxyvaleric acid, hydroxycaproic acid, and hydroxyheptanoic acid; aliphatic polyvalent carboxylic acids such as succinic acid, adipic acid, suberic acid, sebacic acid, dodecanedicarboxylic acid, succinic anhydride, adipic anhydride, trimesic acid, propanetricarboxylic acid, pyromellitic acid, and pyromellitic anhydride; aliphatic polyhydric alcohols such as ethylene glycol, 1,4-butanediol, 1,6-hexanediol, 1,4-cyclohexanedimethanol, neopentyl glycol, decamethylene glycol, glycerin, trimethylolpropane, and pentaerythrite, as far as these components do not influence a molding step and physical properties of the resulting resin composite.

The polylactic acid-based resin may contain other functional groups such as an alkyl group, a vinyl group, a carbonyl group, an aromatic group, an ester group, an ether group, an aldehyde group, an amino group, a nitrile group, and a nitro group, as far as these groups do not influence a molding step and physical properties of the resulting resin composite. The polylactic acid-based resin may be crosslinked with an isocyanate-based crosslinking agent or the like, and may be bonded with a bond other than an ester bond.

The polyamide-based resin expanded sheet 1 can further contain a crosslinking agent. As the crosslinking agent, the known crosslinking agents are used, and examples thereof include an acid dianhydride such as pyromellitic anhydride, a copolymer of maleic anhydride and a vinyl monomer, a polyfunctional epoxy compound, an oxazoline compound, an oxazine compound, and the like. These crosslinking agents may be used alone, or two or more kinds thereof may be used concurrently. The content of the crosslinking agent contained in the polyamide-based resin expanded sheet 1, from a view point of moldability, is preferably 0.05% by mass or more and 10% by mass or less, more preferably 0.1% by mass or more and 5% by mass or less, and further preferably 0.1% by mass or more and 3% by mass or less.

An average cell diameter of the polyamide-based resin expanded sheet 1 is preferably 10 μm or more and 1,000 μm or less, more preferably 100 μm or more and 800 μm or less, and further preferably 150 μm or more and 500 μm or less.

When an impact force is applied to the resin composite A, a part of a cell wall of the polyamide-based resin expanded sheet 1 is destructed with the impact force, and this destruction of the cell wall may be continuously propagated to an adjacent cell wall. At this time, when an average cell diameter of the polyamide-based resin expanded sheet 1 is too large, the number of cells existing in the polyamide-based resin expanded sheet 1 is reduced. In the polyamide-based resin expanded sheet 1 having the small number of cells, destruction of the cell wall becomes easy to reach an interface between the fiber-reinforced resin layer 2. When destruction of the cell wall of the polyamide-based resin expanded sheet 1 reaches an interface between the polyamide-based resin expanded sheet 1 and the fiber-reinforced resin layer 2, a surface of the polyamide-based resin expanded sheet 1 is destructed. As a result, integration between the polyamide-based resin expanded sheet 1 and the fiber-reinforced resin layer 2 becomes insufficient. Besides, when the fiber-reinforced resin layer 2 is peeled from a surface of the polyamide-based resin expanded sheet 1, a problem arises that impact resistance of the resin composite A is deteriorated.

On the other hand, when an average cell diameter of the polyamide-based resin expanded sheet 1 is too small, the number of cells contained in the polyamide-based resin expanded sheet 1 becomes too large, and a thickness of the cell wall becomes too small. As a result, the cell wall becomes easy to be destructed with an impact force which is applied to the polyamide-based resin expanded sheet 1, and destruction of the cell wall becomes easy to reach an interface between the polyamide-based resin expanded sheet 1 and the fiber-reinforced resin layer 2 described later. In that case, based on the same reason as that described above, a problem arises that the fiber-reinforced resin layer 2 is peeled from a surface of the polyamide-based resin expanded sheet 1, and impact resistance of the resin composite A is deteriorated.

An average cell diameter of the polyamide-based resin expanded sheet 1 can be measured by the following test method.

Figure 2:
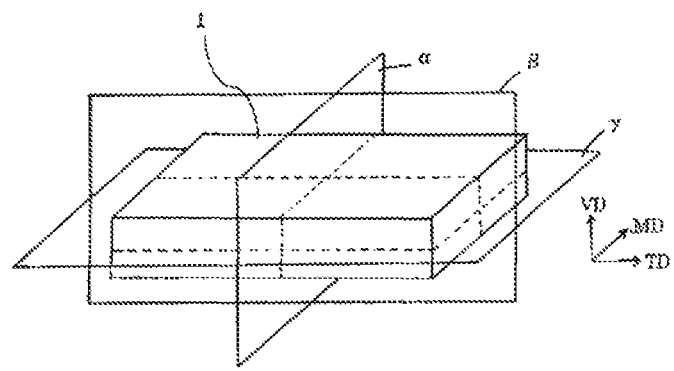
FIG. 2 is a schematic view showing the outline of measuring an average cell diameter of a polyamide-based resin expanded sheet.

As shown in FIG. 2, the polyamide-based resin expanded sheet 1 is cut with a plane α along an extrusion direction (MD: Machine Direction) and vertical to an expanded sheet plane at a central part in a width direction thereof, a cut plane is magnified with a scanning electron microscope 18 to 20 times (200 times depending on circumstances), and a photograph of the cut plane is taken to obtain an enlarged photograph A. In addition, the size of the enlarged photograph A is about ¼ of the size of an A4 paper.

The polyamide-based resin expanded sheet 1 is cut with a plane β along a width direction (TD: Transverse Direction) and vertical to an expanded sheet plane, a cut plane is magnified with a scanning electron microscope 18 to 20 times (200 times depending on circumstances), and a photograph of the cut plane is taken to obtain an enlarged photograph B. In addition, the size of the enlarged photograph B is about ¼ of the size of an A4 paper.

The polyamide-based resin expanded sheet 1 is cut with a plane γ orthogonal with MD and TD, a cut plane is magnified with a scanning electron microscope 18 to 20 times (200 times depending on circumstances), and a photograph of the cut plane is taken to obtain an enlarged photograph C. In addition, the size of the enlarged photograph C is about ¼ of the size of an A4 paper.

The magnification with the scanning electron microscope is adjusted so that, when a straight line having the length of 60 mm is drawn on a printed photograph, the number of cells existing on this straight line becomes around 10 to 20.

Enlarged photographs A to C are taken at arbitrary two places of the polyamide-based resin expanded sheet 1, respectively, to obtain each two of enlarged photographs A to C.

In addition, as the scanning electron microscope, a scanning electron microscope which is commercially available from Hitachi, Ltd. under product name "S-3000N", and a scanning electron microscope which is commercially available from Hitachi High-Technologies Corporation under product name "S-3400N" can be used.

In the enlarged photograph A, a straight line having the length of 60 mm parallel with each of MD and VD (direction of thickness of sheet orthogonal with MD on photograph) is drawn at an arbitrary place, and an average chord length (t) in each direction of a cell is calculated from the number of cells on this straight line by the following equation (1). However, when a thickness of a test piece is small, and the number of cells by the length 60 mm portion cannot be counted in VD, the number of cells by the 30 mm or 20 mm portion is counted, and converted into the number of cells by the 60 mm portion. The straight line was drawn so that the whole cells were placed on the straight line as much as possible. A cell which is only partially placed on the straight line is included in the number of cells.

$$\text{Average chord length } t \text{ (mm)}=60/(\text{number of cells} \times \text{magnification of photograph}) \tag{1}$$

On the enlarged photograph B, a straight line having the length of 60 mm parallel with each of TD and VD (direction of thickness of sheet orthogonal with TD on photograph) is drawn at an arbitrary place, and an average chord length (t) in each direction of a cell is calculated from the number of cells on this straight line by the above-mentioned equation (1).

On the enlarged photograph C, a straight line having the length of 60 mm parallel with each of MD and TD is drawn at an arbitrary place, and an average chord length (t) in each direction of a cell is calculated from the number of cells on this straight line by the above-mentioned equation (1).

The magnification of a photograph is obtained by the following equation (2) by measuring a scale bar on the photograph to 1/100 mm. In addition, as the scale bar, a scale bar which is commercially available from Mitutoyo Corporation under product name "Digimatic Caliper" can be used.

$$\text{Magnification of photograph}=\text{scale bar actually measured value (mm)}/\text{indicated value of scale bar (mm)} \tag{2}$$

Then, a cell diameter D in each direction of MD, TD, and VD is calculated by the following equation (3).

$$D \text{ (mm)}=t/0.616 \tag{3}$$

An average cell diameter of the polyamide-based resin expanded sheet 1 is calculated by the following equation (4) based on a cell diameter of MD ($D_{MD}$), a cell diameter of TD ($D_{TD}$), and a cell diameter of VD ($D_{VD}$). In addition, the cell diameter of MD ($D_{MD}$) is an arithmetic average value of the above-calculated two MD cell diameters. The cell diameter of TD ($D_{TD}$) is an arithmetic average value of the above-calculated two TD cell diameters. The cell diameter of VD ($D_{VD}$) is an arithmetic average value of the above-calculated two VD cell diameters.

$$\text{Average cell diameter (mm)} = (D_{MD} \times D_{TD} \times D_{VD})^{1/3} \quad (4)$$

$D_{MD}$: Cell diameter of MD (mm)
$D_{TD}$: Cell diameter of TD (mm)
$D_{VD}$: Cell diameter of VD (mm)

A thickness of the polyamide-based resin expanded sheet 1 constituting the resin composite A is preferably 0.1 mm or more and 5 mm or less, and more preferably 0.3 mm or more and 4 mm or less. When a thickness of the polyamide-based resin expanded sheet 1 is too small, impact resistance of the resin composite A may be deteriorated. When a thickness of the polyamide-based resin expanded sheet 1 is too large, the polyamide-based resin expanded sheet 1 may be greatly deformed with an impact force which is applied to the resin composite A, to generate a crack in the fiber-reinforced resin layer 2.

That is, it is preferable that, in the resin composite A, a thickness of the polyamide-based resin expanded sheet 1 is 0.1 mm or more, even at a thinnest site of the polyamide-based resin expanded sheet 1.

Besides, it is preferable that, in the resin composite A, a thickness of the polyamide-based resin expanded sheet 1 is 5 mm or less, even at a thickest site of the polyamide-based resin expanded sheet 1.

Tensile elongation at break of the polyamide-based resin expanded sheet 1 constituting the resin composite A is preferably 50% or more and 200% or less, more preferably 80% or more and 150% or less, and particularly preferably 90% or more and 130% or less. When tensile elongation at break of the polyamide-based resin expanded sheet 1 is too low, brittleness of the polyamide-based resin expanded sheet 1 becomes great, and the polyamide-based resin expanded sheet 1 may be broken by an impact force which is applied to the resin composite A to deteriorate impact resistance of the resin composite A. When tensile elongation at break of the polyamide-based resin expanded sheet 1 is too high, the polyamide-based resin expanded sheet 1 may be greatly deformed by an impact force which is applied to the resin composite A, to generate a crack in the fiber-reinforced resin layer 2, thereby, deteriorating impact resistance of the resin composite A.

In addition, tensile elongation at break (elongation) of the polyamide-based resin expanded sheet 1 is measured in accordance with the method described in Japanese Industrial Standards (JIS) K6767:1999 "Cellular Plastics—Polyethylene—Methods of Test". Specifically, after a test piece is retained for 16 hours or longer under the environment of temperature 23±2° C. and relative humidity 50±5%, measurement is performed under the environment of temperature 23±2° C. and relative humidity 50±5%. Using a tensilon universal testing machine and universal testing machine data processing software, measurement is performed under the conditions of a tensile rate of 500 mm/min, an interval between grippers of 100 mm, and a test piece being of a dumbbell shape type 1 (provided in ISO1798:2008). However, elongation is obtained based on a difference between a distance between grippers before a test, and a distance between grippers at break of a test piece. Five test pieces are prepared, and an arithmetic average value of tensile elongation at break of each test piece is defined as tensile elongation at break of the polyamide-based resin expanded sheet 1. In addition, as the tensilon universal testing machine, a testing machine which is commercially available from Orientic Co., Ltd. under product name "UCT-10T" is used. As the data processing software, one commercially available from SOFTBRAIN Co., Ltd. under product name of "UTPS-237S" is used.

A contact angle of the polyamide-based resin expanded sheet 1 is preferably 300 or more and 90° or less, more preferably 40° or more and 85° or less, and further preferably 500 or more and 80° or less. In the polyamide-based resin expanded sheet 1, usually, cells are opened at an end face. Furthermore, in the polyamide-based resin expanded sheet 1, cells may also be opened on a surface, as by generation of small fractures in a cell membrane. For this reason, when a contact angle is too small, in formation of the fiber-reinforced resin layer 2, a resin in the fiber-reinforced resin material easily migrates to a side of the polyamide-based resin expanded sheet 1 through the opening. When a resin of the fiber-reinforced resin layer 2 becomes deficient due to migration of the resin, it becomes difficult to obtain the resin composite A excellent in the strength. When a contact angle is too large, adhesiveness between the fiber-reinforced resin layer 2 and the polyamide-based resin expanded sheet 1 is deteriorated, and when an impact force is applied to the resin composite A, the fiber-reinforced resin layer 2 is liable to peel off from a surface of the polyamide-based resin expanded sheet 1. In that case, it becomes difficult to obtain the resin composite A excellent in impact resistance.

In addition, such a tendency becomes more remarkable in the case where a resin of the fiber-reinforced resin material is a thermoplastic resin than in the case where the resin is a thermosetting resin.

In addition, a contact angle of the polyamide-based resin expanded sheet 1 means a contact angle θ value obtained by the measurement method in accordance with a sessile drop method of JIS R3257:1999 "Testing Method of Wettability of Glass Substrate". A contact angle of the polyamide-based resin expanded sheet 1 is measured, in principle, by preparing a test piece having surface smoothness as by heat-pressing the polyamide-based resin expanded sheet 1 employing a mirror-finished press plate, and measuring a contact angle using the test piece. When the polyamide-based resin expanded sheet itself is used as a test piece, each two (a total of 4) of test pieces of width 50 mm×length 150 mm having a plane rectangular shape are cut out from front and back sides of the polyamide-based resin expanded sheet 1, and are used in the measurement. A contact angle is measured by a droplet method using a solid-liquid interface analyzing device. However, when the polyamide-based resin expanded sheet itself is used as a test piece, generally, a greater value than an actual contact angle is observed due to influence of a surface state thereof. A dropping liquid used in measurement is distilled water, and a liquid amount is 1 μL. A contact angle is measured immediately after dropping of the dropping liquid. A contact angle is calculated by a θ/2 method. The number of tests is 10 for every test piece, and an arithmetic average value of all measured values of a contact angle is defined as a contact angle of the polyamide-based resin expanded sheet 1. Conditioning and test environment are under a temperature of 20±2° C. humidity of 65±5%, and 16 hours or longer. In addition, as the solid-liquid interface analyzing device, a device which is commercially available from Kyowa Interface Science Co., Ltd. under a product name of "DropMaster300" is used. Calculation of a contact angle is performed using software "FAMAS" attached to the solid-liquid interface analyzing device which is commercially available from Kyowa Interface Science Co., Ltd. under a product name of "DropMaster300".

An apparent density of the polyamide-based resin expanded sheet 1 constituting the resin composite A is preferably 0.1 g/cm³ or more and 1.1 g/cm³ or less, and more preferably 0.1 g/cm³ or more and 0.6 g/cm³ or less. When an apparent density is too low, in the case where an impact force is applied to the resin composite A, a cell wall of the polyamide-based resin expanded sheet 1 is easily destructed, and this destruction of the cell wall easily reaches an interface between the polyamide-based resin expanded sheet 1 and the fiber-reinforced resin layer 2. Then, the fiber-reinforced resin layer 2 is liable to peel off from a surface of the polyamide-based resin expanded sheet 1, to deteriorate impact resistance of the resin composite A. Besides, if such peeling occurs, when the resin composite A receives impact, the polyamide-based resin expanded sheet 1 is excessively deformed, and this deformation concentrates an impact force on the fiber-reinforced resin layer 2. Then, a crack may be easily generated in the fiber-reinforced resin layer 2, to deteriorate impact resistance of the resin composite A. When an apparent density is too high, impact absorbability of the polyamide-based resin expanded sheet 1 is deteriorated, and impact resistance of the resin composite A is liable to be deteriorated based on the same reason as that described above. In addition, an apparent density of the polyamide-based resin expanded sheet 1 refers to a value measured in accordance with JIS K7222.

In making the polyamide-based resin expanded sheet 1 exert excellent heat resistance, it is preferable that the polyamide-based resin contained in the polyamide-based resin expanded sheet 1 is a resin having crystallinity.

The polyamide-based resin expanded sheet 1 can prevent thermal deformation or the like, due to crystallization of the contained polyamide-based resin.

It is preferable that a crystallization degree of the polyamide-based resin contained in the polyamide-based resin expanded sheet 1 is 10% or more.

It can be confirmed using a differential scanning calorimeter (for example, Hitachi High-Tech Science Corporation, product name "DSC7020") that the polyamide-based resin has crystallinity.

That is, by demonstrating that the polyamide-based resin exhibits heat absorption associated with melting or heat generation associated with crystallization, it can be confirmed that the polyamide-based resin has crystallinity.

Additionally, a crystallization degree of the polyamide-based resin in the polyamide-based resin expanded sheet 1 can also be confirmed using a differential scanning calorimeter.

Specifically, a crystallization degree of the polyamide-based resin can be measured with the outline of the following.

A crystallization degree of the polyamide-based resin can be measured by the method described in JIS K7122: 2012 "Testing Methods for Heat of Transitions of Plastics".

However, the sampling method and the temperature conditions are as follows.

About 5 mg of a sample is filled on a bottom of a measurement container made of aluminum without gaps, a DSC curve is obtained when under a nitrogen gas flow rate of 20 mL/min, a temperature is lowered from 30° C. to −40° C. and retained for 10 minutes, a temperature is raised from −40° C. to 290° C. (1st Heating), and retained for 10 minutes, a temperature is lowered from 290° C. to −40° C. (Cooling), and retained for 10 minutes, and a temperature is raised from −40° C. to 290° C. (2nd Heating). In addition, all temperature rising and temperature lowering are performed at a rate of 10° C./min, and alumina is used as a standard substance.

A crystallization degree calculated from crystallization heat quantity is the ratio obtained by dividing crystallization heat quantity Q (J/g) obtained from an area of a crystallization peak which is seen during Cooling process by theoretical melting heat quantity ΔHf (J/g) of a perfect crystal of the polyamide-based resin.

Crystallization heat quantity is calculated from an area of a part surrounded with a straight line connecting a point at which a DSC curve is departed from a baseline on a high temperature side, and a point at which the DSC curve returns again to a baseline on a low temperature side, and the DSC curve, using analysis software attached to the device.

Namely, a crystallization degree is obtained from the following equation.

Crystallization degree (%)=$Q$(J/g)/$\Delta Hf$(J/g)×100

In addition, theoretical melting heat quantity (ΔHf) of a perfect crystal of the polyamide-based resin is different depending on a kind of the resin, but a value thereof is approximately 200 to 300 J/g (reference values of ΔHf: PA6: 230 J/g, PA11: 244 J/g, PA12: 245 J/g, PA66: 226 J/g, PA69: 257 J/g, PA610: 254 J/g, PA612: 258 J/g, . . . ).

From such a thing, the polyamide-based resin expanded sheet 1 exhibits crystallization heat quantity of preferably 20 J/g or more, and more preferably crystallization heat quantity of 30 J/g or more, not depending on a kind of the polyamide-based resin to be used, when the above-mentioned measurement is performed.

Then, a method for producing the polyamide-based resin expanded sheet 1 will be explained. As the method for producing the polyamide-based resin expanded sheet 1, the known production method can be used.

Specifically, examples thereof include (a1) a method for producing a polyamide-based resin expanded sheet by supplying a polyamide-based resin to an extruder, melting and kneading the resin in the presence of a blowing agent such as a chemical blowing agent and a physical blowing agent, and a cell nucleating agent, and extrusion-expanding a melted and kneaded product from the extruder (extrusion expansion method); (a2) a method for producing a polyamide-based resin expanded sheet by supplying a polyamide-based resin and a chemical blowing agent to an extruder, melting and kneading them at a temperature of lower than a degradation temperature of the chemical blowing agent, producing an expandable resin sheet from the extruder, and expanding this expandable resin sheet; and the like.

Examples of the chemical blowing agent include azodicarbonamide, dinitrosopentamethylenetetramine, hydrazoyldicarbonamide, sodium bicarbonate, and the like. In addition, the chemical blowing agent may be used alone, or two or more kinds thereof may be used concurrently.

Examples of the physical blowing agent include saturated aliphatic hydrocarbons such as propane, normal butane, isobutane, normal pentane, isopentane, and hexane, ethers such as dimethyl ether, methyl chloride, fluorocarbons such as 1,1,1,2-tetrafluoroethane, 1,1-difluoroethane, and monochlorodifluoromethane, carbon dioxide, nitrogen, and the like, and dimethyl ether, propane, normal butane, isobutane, and carbon dioxide are preferable, propane, normal butane, and isobutane are more preferable, and normal butane and isobutane are particularly preferable. In addition, the physical blowing agent may be used alone, or two or more kinds thereof may be used concurrently.

An average cell diameter of the polyamide-based resin expanded sheet 1 can be controlled, for example, by adjusting an amount of a cell nucleating agent.

Examples of the cell nucleating agent include inorganic compounds such as talc, mica, silica, diatomaceous earth, alumina, titanium oxide, zinc oxide, magnesium oxide, magnesium hydroxide, aluminum hydroxide, calcium hydroxide, potassium carbonate, calcium carbonate, magnesium carbonate, potassium sulfate, barium sulfate, sodium hydrogen carbonate, and glass beads; organic compounds such as polytetrafluoroethylene, azodicarbonamide, and a mixture of sodium hydrogen carbonate and citric acid, inert gases such as nitrogen, and the like. Among them, as the inorganic compound, talc is preferable, and as the organic compound, polytetrafluoroethylene is preferable, due to the high effect of refining cells. Further, as polytetrafluoroethylene, those that increase a melt tension of a resin due to fibrillation when dispersed, are particularly preferable. An addition amount of the cell nucleating agent is preferably 0.01 parts by mass or more and 15 parts by mass or less, per 100 parts by mass of a resin component.

Tensile elongation at break of the polyamide-based resin expanded sheet 1 can be controlled, for example, by regulation of a cell diameter of the polyamide-based resin expanded sheet 1, or regulation of a crosslinking degree of the polyamide-based resin expanded sheet 1.

In the resin composite A of the present embodiment, the fiber-reinforced resin layer 2 is integrally laminated on a surface (preferably, both sides) of the polyamide-based resin expanded sheet 1. In addition, since impact resistance of the resin composite A is excellent, a resin composite A in which fiber-reinforced resin layers 2,2 are integrally laminated on both sides of the polyamide-based resin expanded sheet 1 was shown in FIG. 1, but the resin composite A is not limited to this, may be appropriately determined depending on intended use, and may be a resin composite in which a fiber-reinforced resin layer 2 is integrally laminated on only one side of the polyamide-based resin expanded sheet 1.

(Fiber-Reinforced Resin Layer 2)

The fiber-reinforced resin layer 2 used in the resin composite A of the present embodiment is a reinforcing fiber which is impregnated with a resin. The resin impregnated therein effectively acts to bond reinforcing fibers together. Thereby, the mechanical strength of the fiber-reinforced resin layer 2 can be improved, and the mechanical strength of the resin composite A can be improved.

Examples of the reinforcing fiber constituting the fiber-reinforced resin layer 2 include inorganic fibers such as a glass fiber, a carbon fiber, a silicon carbide fiber, an alumina fiber, a tyranno fiber, a basalt fiber, and a ceramic fiber; metal fibers such as a stainless fiber and a steel fiber; organic fibers such as an aramid fiber, a polyethylene fiber, and a polyparaphenylene benzoxazole (PBO) fiber; a boron fiber; and the like. The reinforcing fiber may be used alone, or two or more kinds thereof may be used concurrently. Among them, as the reinforcing fiber, a carbon fiber, a glass fiber, and an aramid fiber are preferable, and a carbon fiber is more preferable. These reinforcing fibers have the excellent mechanical strength, although they are lightweight.

It is preferable that the reinforcing fiber is used as a fiber substrate which has been processed into a desired shape. Examples of the fiber substrate include a woven fabric, a knitted fabric, a non-woven fabric, a face material obtained by bonding (sewing) fiber bundles (strands) in which fibers are arranged in one direction, with yarn, and the like. Examples of a way of weaving a woven fabric include plain weave, twill weave, sateen weave, and the like. Further, examples of the yarn include resin yarn such as polyamide resin yarn and polyester resin yarn, and stitch yarn such as glass fiber yarn.

As the fiber substrate, only one fiber substrate may be used as a monolayer, or a plurality of fiber substrates may be used as a laminate by laminating them. As a laminate in which a plurality of fiber substrates are laminated, (b1) a laminate obtained by preparing a plurality of only one kind of fiber substrates, and laminating these fiber substrates; (b2) a laminate obtained by preparing a plurality of kinds of fiber substrates, and laminating these fiber substrates; (b3) a laminate obtained by preparing a plurality of face materials obtained by bonding (sewing) fiber bundles (strands) in which fibers are arranged in one direction, with yarn, overlapping these face materials so that fiber directions of fiber bundles direct in mutually different directions, and integrating (sewing) overlapped face materials with yarn; and the like are used. In addition, examples of the yarn include resin yarn such as polyamide resin yarn and polyester resin yarn, and stitch yarn such as glass fiber yarn.

Figure 3:
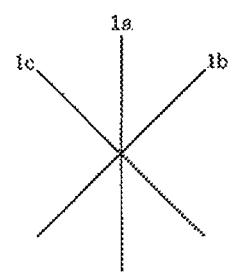
FIG. 3 is a view showing orientation of a reinforcing fiber constituting a fiber-reinforced resin layer.
Figure 4:
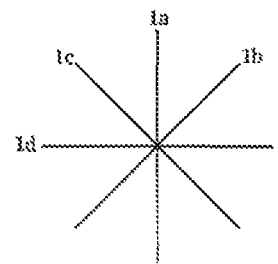
FIG. 4 is a view showing orientation of a reinforcing fiber constituting a fiber-reinforced resin layer.

In the case of the laminates of (b1) and (b2), it is preferable that the length directions of warp yarns (weft yarns) constituting each woven fabric are radially arranged when seen from a plane direction of the woven fabric. Specifically, as shown in FIG. 3 and FIG. 4, when the length directions of warp yarns (weft yarns) constituting each woven fabric are let to be 1$a$, 1$b$, ..., respectively, it is preferable that the length directions 1$a$, 1$b$, ... of the warp yarns (weft yarns) are radially arranged, and it is more preferable that when the length direction 1$a$ of an arbitrary warp yarn (weft yarn) among the length directions 1$a$, 1$b$, ... of the warp yarns (weft yarns) is specified, the length directions 1$b$, 1$c$, ... of other warp yarns (weft yarns) are arranged line-symmetrically about the length direction 1$a$ of the specific warp yarn (weft yarn).

Furthermore, a cross angle between the length directions 1$a$, 1$b$, ... of the warp yarns (weft yarns) constituting each woven fabric is preferably 90° when two woven fabrics are overlapped, and is preferably 45° when three or more woven fabrics are overlapped, since the strength of the fiber substrate is not biased in one direction, and approximately the same mechanical strength can be imparted in an arbitrary direction.

It is preferable that, in the laminate of (b3), the length directions of fibers of fiber bundles constituting each face material are radially arranged when seen from a plane direction of the face material. Specifically, as shown in FIG. 3 and FIG. 4, when the length directions of fibers of fiber bundles constituting each face material are let to be 1$a$, 1$b$, ... respectively, it is preferable that length directions of these fibers 1$a$, 1$b$, ... are radially arranged, and when an arbitrary length direction 1$a$ among the length directions of fibers 1$a$, 1$b$, ... is specified, it is more preferably that other length directions 1$b$, 1$c$, ... are arranged line symmetrically about the specified length direction 1$a$.

Furthermore, a cross angle between the length directions 1$a$, 1$b$, ... of fibers of fiber bundles constituting each face material is preferably 90° when two face materials are overlapped, and is preferably 45° when three or more face materials are overlapped, since the strength of the fiber substrate is not biased in one direction, and approximately the same mechanical strength can be imparted in an arbitrary direction.

As a resin to be impregnated into the reinforcing fiber, either of a thermoplastic resin or a thermosetting resin may be used, and the thermosetting resin is preferably used.

Examples of the thermosetting resin include, but are not particularly limited to, an epoxy resin, an unsaturated polyester resin, a phenol resin, a melamine resin, a polyurethane resin, a silicone resin, a maleimide resin, a vinyl ester resin, a cyanic acid ester resin, a resin obtained by preliminarily polymerizing a maleimide resin and a cyanic acid ester resin, and the like. Among them, an epoxy resin and a vinyl ester resin are preferable, due to excellent heat resistance, impact resistance or chemical resistance. An additive such as a curing agent and a curing accelerator may be contained in the thermosetting resin. In addition, the thermosetting resin may be used alone, or two or more kinds thereof may be used concurrently.

Examples of the thermoplastic resin include, but are not particularly limited to, an olefin-based resin, a polyester-based resin, a thermoplastic epoxy resin, an amide-based resin, a polyamide-based resin, a thermoplastic polyurethane resin, a sulfide-based resin, an acrylic-based resin, and the like. Among them, a polyamide-based resin and a thermoplastic epoxy resin are preferable, due to excellent adhesiveness with the polyamide-based resin expanded sheet 1. In addition, the thermoplastic resin may be used alone, or two or more kinds thereof may be used concurrently.

Examples of the thermoplastic epoxy resin include a polymer which is a polymer or a copolymer of epoxy compounds and has a straight-chain structure, and a copolymer of an epoxy compound and a monomer polymerizable with this epoxy compound, which has a straight-chain structure. Specifically, examples of the thermoplastic epoxy resin include a bisphenol A-type epoxy resin, a bisphenol fluorene-type epoxy resin, a cresol novolac-type epoxy resin, a phenol novolac-type epoxy resin, a cyclic aliphatic-type epoxy resin, a long chain aliphatic-type epoxy resin, a glycidyl ester-type epoxy resin, a glycidylamine-type epoxy resin, and the like. Among them, a bisphenol A-type epoxy resin and a bisphenol fluorene-type epoxy resin are preferable. In addition, the thermoplastic epoxy resin may be used alone, or two or more kinds thereof may be used concurrently.

Examples of the thermoplastic polyurethane resin include polymers having a straight-chain structure obtained by polymerizing a diol and a diisocyanate. Examples of the diol include ethylene glycol, diethylene glycol, propylene glycol, dipropylene glycol, 1,3-butanediol, 1,4-butanediol, and the like. The diol may be used alone, or two or more kinds thereof may be used concurrently. Examples of the diisocyanate include an aromatic diisocyanate, an aliphatic diisocyanate, and an alicyclic diisocyanate. The diisocyanate may be used alone, or two or more kinds thereof may be used concurrently. In addition, the thermoplastic polyurethane resin may be used alone, or two or more kinds thereof may be used concurrently.

As the polyamide-based resin, the same polyamide-based resin as a material for forming the polyamide-based resin expanded sheet 1 can be used. In addition, the polyamide-based resin may be used alone, or two or more kinds thereof may be used concurrently. Among them, as the polyamide resin for forming the fiber-reinforced resin layer 2, polyamide 6, polyamide 6,6, and polyamide 12 are preferable.

The content of the reinforcing fiber in the fiber-reinforced resin layer 2 is preferably 30% by mass or more and 80% by mass or less, and more preferably 30% by mass or more and 60% by mass or less. When the content of the reinforcing fiber is too small, the mechanical strength such as bending modulus of the fiber-reinforced resin layer 2 is liable to reduce, to be not able to sufficiently improve the mechanical strength such as impact resistance of the resin composite A.

When the content of the reinforcing fiber is too large, bendability between the reinforcing fibers, or adhesiveness between the fiber-reinforced resin layer 2 and the polyamide-based resin expanded sheet 1 becomes insufficient, and there is a possibility that the mechanical strength such as bending modulus of the fiber-reinforced resin layer 2 and impact resistance of the resin composite A cannot be sufficiently improved.

A thickness of the fiber-reinforced resin layer 2 is preferably 0.02 mm or more and 2 mm or less, and more preferably 0.05 mm or more and 1 mm or less. The fiber-reinforced resin layer 2 having a thickness within the above-mentioned range is excellent in the mechanical strength, although it is lightweight.

A weight per unit area of the fiber-reinforced resin layer 2 is preferably 50 $g/m^2$ or more and 4,000 $g/m^2$ or less, and more preferably 100 $g/m^2$ or more and 1,000 $g/m^2$ or less. The fiber-reinforced resin layer 2 having a weight per unit area within the above-mentioned range is excellent in the mechanical strength, although it is lightweight.

According to the resin composite A of the present embodiment, the fiber-reinforced resin layer 2 is integrally laminated on a surface of the polyamide-based resin expanded sheet 1 excellent in impact resistance, and the mechanical strength and impact resistance of the resin composite A have been improved.

Furthermore, according to the resin composite A of the present embodiment, since the fiber-reinforced resin layer 2 is integrally laminated on a surface of the polyamide-based resin expanded sheet 1, an impact force which has been applied to the resin composite A is propagated and diffused to the whole fiber-reinforced resin layer 2, and thereafter, transmitted to the whole polyamide-based resin expanded sheet 1. Accordingly, an impact force which has been applied to the resin composite A is effectively absorbed by the whole polyamide-based resin expanded sheet 1. Hence, the resin composite A of the present embodiment has excellent impact resistance (impact absorbing capacity). Such a resin composite A is suitably used as a constituent member of aircrafts, automobiles, ships, constructions, and the like, or a housing of electronic equipment, without particular limitation.

Then, a method for manufacturing the resin composite A of the present embodiment will be explained.

An example of the method for manufacturing the resin composite A includes, but is not particularly limited to, a method of laminating a fiber-reinforced resin material containing a reinforcing fiber impregnated with a resin on a surface (one side or both sides) of the polyamide-based resin expanded sheet 1, to manufacture a laminate, heating the laminate, pressing the laminate in the thickness direction of the polyamide-based resin expanded sheet 1, thereby, integrally laminating the fiber-reinforced resin material as the fiber-reinforced resin layer 2 to the surface of the polyamide-based resin expanded sheet 1.

Specifically, a fiber-reinforced resin material containing a reinforcing fiber impregnated with a resin is laminated on a surface of the above-mentioned polyamide-based resin expanded sheet 1 to manufacture a laminate. A surface on which the fiber-reinforced resin material is laminated in the polyamide-based resin expanded sheet may be determined depending on intended use of the resulting resin composite A, without particular limitation. Accordingly, the surface may be either at least one side or both sides of the polyamide-based resin expanded sheet 1. When impact resistance of the resulting resin composite A is considered, it is preferable that the fiber-reinforced resin material is laminated on both sides of the polyamide-based resin expanded sheet 1.

In addition, since a resin, a resin and a reinforcing fiber used in the polyamide-based resin expanded sheet 1 and the fiber-reinforced resin material used in the laminate are the same as the resin, the resin and the reinforcing fiber used in the polyamide-based resin expanded sheet 1 and the fiber-reinforced resin layer 2 in the above-mentioned composite A, detailed explanation of them is omitted.

A method of impregnating a resin into a reinforcing fiber is not particularly limited, but examples thereof include (c1) a method of immersing a reinforcing fiber in a resin to impregnate the reinforcing fiber with the resin; (c2) a method of coating a resin on a reinforcing fiber to impregnate the reinforcing fiber with the resin; (c3) a method of laminating a sheet containing a resin on a fiber substrate, thereafter, heat-pressing them, to impregnate the fiber substrate with the resin contained in the sheet; and the like. Alternatively, in the methods of (c1) and (c2), by using a reinforcing fiber as a fiber substrate, and immersing the fiber substrate in a resin, or by coating a resin on the fiber substrate, the reinforcing fiber constituting the fiber substrate may be impregnated with the resin.

In addition, as the fiber substrate, or the fiber-reinforced resin material containing the fiber substrate impregnated with a resin, commercially available one can be used. The fiber substrate is commercially available, for example, from Mitsubishi Rayon Co., Ltd. under a product name of "PYROFIL". Additionally, the fiber-reinforced resin material containing the fiber substrate impregnated with a thermosetting resin is commercially available, for example, from Mitsubishi Rayon Co., Ltd. under a product name of "PYROFIL Prepreg". The fiber-reinforced resin material containing the fiber substrate impregnated with a thermoplastic resin is commercially available from Nagase ChemteX Corporation under a product name of "NNGF60-03s", from ICHIMURA SANGYO Co., Ltd. under a product name of "CF-SS", from BOND LAMINATES under a product name of "TEPEX", and so on.

The resin composite A can be prepared using the above-described laminate with the outline of the following.

The thus manufactured laminate is pressed in the thickness direction thereof while heating with an infrared heater or the like. By heating the laminate, the fiber-reinforced resin material and the polyamide-based resin expanded sheet 1 are heated. By heating of the laminate, the resin contained in the fiber-reinforced resin material is softened to be brought into a state having flowability, and if necessary, the fiber-reinforced resin material and the polyamide-based resin expanded sheet 1 are molded into a desired shape. When the resin contains a thermosetting resin, the thermosetting resin is softened to be brought into a state having flowability, without being cured. Since the thermosetting resin is brought into a state having flowability, before thermal curing by heating, a temperature is controlled so as to maintain this state having flowability. When the resin contains a thermoplastic resin, a temperature is controlled so that the thermoplastic resin is brought into a state having flowability.

When the resin of the fiber-reinforced resin material is thermally curable, and a glass transition temperature of the resin is expressed by $Tg1$ (° C.), a temperature for heating the laminate is preferably ($Tg1-60°$ C.) or higher and ($Tg1+80°$ C.) or lower, and more preferably ($Tg1-50°$ C.) or higher and ($Tg1+70°$ C.) or lower. Additionally, when the resin is a thermoplastic amorphous resin, and a glass transition temperature of the resin is expressed by $Tg2$ (° C.), a temperature for heating the laminate is preferably ($Tg2+10°$ C.) or higher and ($Tg2+100°$ C.) or lower, and more preferably ($Tg2+40°$ C.) or higher and ($Tg2+80°$ C.) or lower. Additionally, when the resin is a thermoplastic crystallizable resin, and a melting point of the resin is expressed by $Tm$ (° C.), a temperature for heating the laminate is preferably ($Tm-60°$ C.) or higher and ($Tm+60°$ C.) or lower, and more preferably ($Tm-40°$ C.) or higher and ($Tm+50°$ C.) or lower. When a heating temperature is too low, softening of the resin which has been impregnated into the fiber-reinforced resin material becomes insufficient, and the fiber-reinforced resin layer 2 formed of the fiber-reinforced resin material may not be integrally laminated on the polyamide-based resin expanded sheet 1 with sufficient strength. When a heating temperature is too high, cells of the polyamide-based resin expanded sheet 1 are destructed by heat, and lightweight property and impact resistance of the resulting resin composite A may be deteriorated. In the present specification, a temperature for heating the laminate refers to a surface temperature of the fiber-reinforced resin material of the laminate. When two or more kinds of the thermosetting resins or thermoplastic resins are contained in the resin, a temperature for heating the laminate is adjusted at a highest temperature among heating temperatures suitable for respective resins. When two or more kinds of the thermosetting resins are contained in the resin, it is preferable to adjust a temperature for heating the laminate so that all thermosetting resins are brought into a state having flowability, without being cured.

In addition, a melting point and a glass transition temperature of the thermoplastic resin can be obtained based on the method described in JIS K7121:1987 "Testing Methods for Transition Temperatures of Plastics". However, sampling method and temperature conditions are as described below.

Using a differential scanning calorimeter, about 6 mg of a sample is filled on a bottom of a measurement container made of aluminum without gaps, and under a nitrogen gas flow rate of 20 mL/min, a temperature of the sample is lowered from 30° C. to −40° C. and thereafter retained for 10 minutes, thereafter, a temperature of the sample is raised from −40° C. to 2900° C. (1st Heating) and retained at 290° C. for 10 minutes, and thereafter, a temperature is lowered from 290° C. to −40° C. (Cooling). After a temperature of the sample is retained at −40° C. for 10 minutes, the temperature is raised from −40° C. to 290° C. (2nd Heating) and a DSC curve at this point was obtained. In addition, all temperature raising rates and temperature lowering rates are 10° C./min, and as a standard substrate, alumina is used.

In the present specification, a melting point refers to an endothermic peak temperature in a DSC curve, which is obtained during 2nd Heating process.

In the present specification, a glass transition temperature refers to an intermediate point glass transition temperature obtained from a DSC curve, which is obtained during 2nd Heating process. Likewise, this intermediate point glass transition temperature can be obtained based on JIS K7121: 1987 (9.3 "Method for Determining the Glass Transition Temperature"). In addition, as the differential scanning calorimeter, a differential scanning calorimeter which was commercially available from SII Nano Technology Inc. (current, Hitachi High-Tech Science Corporation) under a product name of "Model DSC6220" or the like can be used.

In the present specification, a glass transition temperature of the thermosetting resin refers to a temperature which was measured with the outline of the following. When a glass transition temperature of the thermosetting resin is measured, it is necessary that the thermosetting resin has been cured in advance. An exothermic peak temperature measured in JIS K7121:1987±10° C. is handled as a standard of a curing temperature of the thermosetting resin. Sixty minutes is handled as a standard of a curing time for the thermosetting resin, and when an exothermic peak of the thermosetting resin after curing is measured in accordance with JIS K7121:1987, if an exothermic peak is not observed, curing can be regarded as being completed, and this thermosetting resin after curing is used to measure a glass transition temperature of the thermosetting resin with the outline described later. In addition, a detailed method of measuring the above-mentioned exothermic peak temperature which is a standard of a curing temperature of the thermosetting resin is as follows. An exothermic peak of the thermosetting resin is measured by the method described in JIS K7121:1987 "Testing Methods for Transition Temperatures of Plastics". However, sampling method and temperature conditions are as follows. Using a differential scanning calorimeter, about 6 mg of a sample is filled on a bottom of a measurement container made of aluminum without gaps, and a temperature of the sample is raised from 30° C. to 220° C. at a rate of 5° C./min using alumina as a standard substrate, under a nitrogen gas flow rate of 20 mL/min. In the present specification, an exothermic peak temperature of the thermosetting resin is a value obtained by reading a temperature of a peak top at first temperature rising. In addition, as the differential scanning calorimeter, a differential scanning calorimeter which was commercially available from SII Nano Technology Inc. (current, Hitachi High-Tech Science Corporation) under a product name "Model DSC6220" or the like can be used.

A glass transition temperature of the thermosetting resin is a temperature measured in accordance of Standard 9.3 "Method for Determining the Glass Transition Temperature" in JIS K7121 (1987) "Testing Methods for Transition Temperatures of Plastics". Specifically, 6 mg of a thermosetting resin after curing, for which a glass transition temperature is measured, is collected as a sample. Using a differential scanning calorimeter, in the device, under a nitrogen gas flow rate of 20 mL/min, a temperature of the sample is raised from 30° C. to 200° C. at a temperature raising rate of 20° C./min, and the sample is retained at 200° C. for 10 minutes. Thereafter, the sample is rapidly taken out from the device, and cooled to 25±10° C., thereafter, in the device, under a nitrogen gas flow rate of 20 mL/min, a temperature of the sample is raised again to 200° C. at a temperature raising rate of 20° C./min to obtain a DSC curve, and a glass transition temperature (intermediate point) is calculated from the resultant DSC curve. In measurement, as a standard substance, alumina is obtained. In addition, as the differential scanning calorimeter, for example, a differential scanning calorimeter which was commercially available from SII Nano Technology Inc. (current, Hitachi High-Tech Science Corporation) under a product name of "Model DSC6220" or the like can be used.

When the resin contained in the fiber-reinforced resin material contains the thermosetting resin, the thermosetting resin is cured, thereby, reinforcing fibers are bonded together to obtain a fiber-reinforced resin layer 2, and the polyamide-based resin expanded sheet 1 and the fiber-reinforced resin layer 2 are integrated with the cured thermosetting resin contained in the fiber-reinforced resin layer 2 to obtain a resin composite A.

A heating temperature for curing an uncured thermosetting resin contained in the fiber-reinforced resin material of the laminate may be the same as the heating temperature of the laminate at pressing, or may be changed, but in order to promote curing of the thermosetting resin, it is preferable that a heating temperature for the laminate is raised more than the temperature for heating the laminate at pressing.

A heating temperature for curing an uncured thermosetting resin contained in the fiber-reinforced resin material of the laminate is preferably (glass transition temperature of thermosetting resin−50° C.) or higher and (glass transition temperature of thermosetting resin+50° C.) or lower, and more preferably (glass transition temperature of thermosetting resin−40° C.) or higher and (glass transition temperature of thermosetting resin+40° C.) or lower. When the heating temperature is too low, curing of the thermosetting resin becomes insufficient, and the mechanical strength of the resulting resin composite A may be reduced. When the heating temperature is too high, cells of the polyamide-based resin expanded sheet 1 are destructed by heat, and lightweight property and impact resistance of the resulting resin composite A may be deteriorated. When two or more kinds of thermosetting resins are contained in the resin, a glass transition temperature of the thermosetting resin is defined as a highest glass transition temperature among glass transition temperatures of the thermosetting resins contained in the resins.

On the other hand, when the resin contained in the fiber-reinforced resin material contains a thermoplastic resin, unlike the case where the thermosetting resin is contained, the above-mentioned curing step is not necessary, and after the laminate is heated, the fiber-reinforced resin material can be cooled to obtain a fiber-reinforced resin layer 2. Also in this case, by the action of the thermoplastic resin of the fiber-reinforced resin layer 2, the fiber-reinforced resin layer 2 is integrated with the polyamide-based resin expanded sheet 1.

In addition, for integral lamination of the polyamide-based resin expanded sheet 1 and the thermoplastic resin of the fiber-reinforced resin layer 2, in addition to heat fusion between resins, they can also be integrally laminated using the known method such as coating the known adhesive having adhesiveness with both resins in advance. In this case, in order to potentiate the adhering force, the known substrate treating agent may be used concurrently.

When a plurality of fiber-reinforced resin materials are overlapped and laminated on a surface of the polyamide-based resin expanded sheet 1, the fiber-reinforced resin materials are integrated by heating and pressing of the above-mentioned laminate, to form a fiber-reinforced resin layer 2.

As a method of integrating the above-mentioned laminate to manufacture a resin composite A, when the fiber-reinforced resin material is the thermosetting resin, the known molding method such as a hand-lay-up method, an autoclave method, a heat pressing method, an RTM method, and a VaRTM method can be adopted. Among them, a heat-pressing molding method by a matched molding system is preferable since a resin composite A having good appearance can be obtained even when a fiber-reinforced resin material poor in moldability is used. On the other hand, when the fiber-reinforced resin material is the thermoplastic resin, the known method of thermally molding the thermoplastic resin sheet such as a method of pressing with a heated molding cavity, and a method of pressing a pre-heated laminate with a molding cavity can be adopted. Among them, thermal molding by a matched molding system is preferable since a resin composite A having good appearance can be obtained even when a fiber-reinforced resin material poor in moldability is used.

An apparent density of the resin composite A is preferably 0.3 g/cm³ or more and 1.5 g/cm³ or less, and more preferably 0.5 g/cm³ or more and 1.3 g/cm³ or less. When an apparent density is too low, impact resistance of the resin composite A may be deteriorated, and when an apparent density is too high, lightweight property of the resin composite A may be deteriorated. In addition, an apparent density of the resin composite A refers to a value measured in accordance with JIS K7222.

That is, an apparent density of the resin composite A is obtained by dividing a total amount of the resin composite A by an apparent volume of the resin composite A.

In addition, in the present embodiment, the resin composite of the present invention is exemplified as described above, but the resin composite of the present invention is not limited to above-mentioned exemplification, and even a matter which is not directly described in the above description can be adopted as far as the matter is the technical matter which does not remarkably deteriorate the effect of the present invention.

EXAMPLES

The present invention will be explained in detail below by way of Examples, but the present invention is not limited to them.

Example 1

An aluminum plate was prepared, a mold release agent (manufactured by Chemlease Japan Co., Ltd., product name "Chemlease 2166") was coated on an upper surface of this aluminum plate, this was allowed to stand for 1 day, and an upper surface of the aluminum plate was mold release-treated. In addition, an external peripheral edge of an aluminum plate upper surface was not subjected to mold release treatment since a sealing material 7 and a back valve 11 described later were disposed at that edge.

Figure 5:
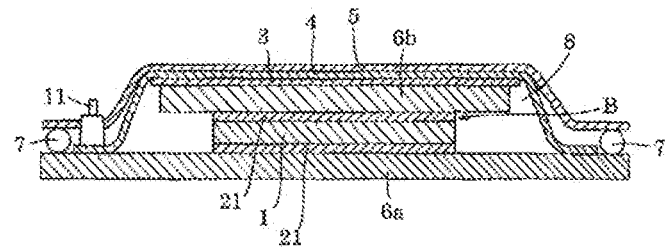
FIG. 5 is a schematic cross-sectional view showing one example of the outline of manufacturing a resin composite.

As shown in FIG. 5, using the aluminum plate having an upper surface which had been mold release-treated as a pressing plate 6a, two overlapped fiber-reinforced resin materials 21 were placed on a surface of the pressing plate 6a which had been subjected to mold release treatment, and a polyamide-based resin expanded sheet 1 was placed on these fiber-reinforced resin materials 21.

Herein, in the fiber-reinforced resin material 21, a commercially available carbon fiber-reinforced resin material (CFRP, manufactured by Mitsubishi Rayon Co., Ltd.; product name "PYROFIL Prepreg TR3523 381GMP"; weight per unit area: 200 g/m²; thickness: 0.23 mm) formed of a woven fabric of twill weave consisting of a carbon fiber (reinforcing fiber) was used. A shape of this fiber-reinforced resin material 21 was a planar square shape of longitudinal 16 cm×transverse 16 cm. The fiber-reinforced resin material 21 contained a thermosetting epoxy resin as a resin, and the content of the thermosetting epoxy resin in the fiber-reinforced resin material 21 was 40% by mass. Two fiber-reinforced resin materials 21 were overlapped so that an angle formed by length directions of warp yarns thereof became 90°.

In the polyamide-based resin expanded sheet 1, as a polyamide-based resin, polyamide 6 (manufactured by UNITIKA LTD., UNITIKA Nylon 6 A1030BRT) which had been prepared by an extrusion expanding method was used. The polyamide-based resin expanded sheet 1 had a thickness of 2.2 mm, an average cell diameter of 390 μm, a contact angle of 68.6°, and an apparent density of 0.25 g/cm³.

Additionally, a shape of the polyamide-based resin expanded sheet 1 was a planar square shape of longitudinal 16 cm×transverse 16 cm.

Additionally, besides from the above, the two fiber-reinforced resin materials 21 same as those described above were prepared, and the two fiber-reinforced resin materials 21 were overlapped with the same outline as that described above. These overlapped two fiber-reinforced resin materials 21 were further placed on the polyamide-based resin expanded sheet 1 to prepare a laminate B.

Then, on a surface of the pressing plate 6a which had been peeling-treated, a pair of spacers (not shown) was placed on outer sides of both ends in a width direction of the laminate B. In addition, in the spacer, an aluminum plate having a thickness of 5 mm was used. An upper surface of the spacer contacting with the pressing plate 6b described later had been subjected to mold release treatment in advance.

In the same manner as described above, an aluminum plate having a lower surface which had been peeling-treated was prepared as the pressing plate 6b, and the pressing plate 6b was placed on the laminate B and the spacer.

Thereafter, on the pressing plate 6b, a release film 3 having a through pore (manufactured by AIRTECH, product name "WL5200B-P") and a blazer cloth 4 (manufactured by AIRTECH, product name "AIRWEAVE N4") were laminated in an order so as to totally cover this pressing plate 6b. The blazer cloth 4 was disposed so as to also cover both sides (left and right sides in FIG. 5) of the laminate B.

Herein, as the release film 3, a release film formed of a tetrafluoroethylene-ethylene copolymer film, in which many through pores penetrating between both sides are formed and a thermosetting resin in the fiber-reinforced resin material 21 can pass therethrough, was used. As the blazer cloth 4, a blazer cloth formed of a non-woven fabric composed of a polyester resin fiber, and which is configured to be able to be impregnated with a thermosetting resin was used.

Next, a bagging film 5 (manufactured by AIRTECH, product name "WL7400") was further covered on the blazer cloth 4, an external peripheral edge of the bagging film 5 and the pressing plate 6a facing thereto were airtightly joined using a sealant tape (manufactured by AIRTECH, product name "GS43MR") as a sealing material 7, to seal the laminate B with the bagging film 5. As the bagging film 5, a bagging film composed of a polyamide resin film was used.

A back valve 11 (manufactured by AIRTECH, product name "VAC VALVE 402A") was disposed on a part of the bagging film 5 to prepare a laminate structure.

Next, the above-described laminate structure was supplied into an autoclave for a heat curing test (manufactured by Hanyuda, product name "DL-2010"), the back valve 11 of the laminate structure was connected to a vacuum line, and the back valve 11 was evacuated to reduce a pressure in a space part 8 sealed with the bagging film 5 to a vacuum degree of 0.10 MPa. In addition, reduction in a pressure of the space part 8 was continuously performed thereafter.

Thereafter, a temperature in the autoclave was raised to 90° C. at a temperature raising rate of 4° C./min to make a temperature in the autoclave 90° C. the laminate B was heated for 90 minutes, thereby, the thermosetting resin in the fiber-reinforced resin material 21 is softened, to deform the fiber-reinforced resin material 21 along a surface of the polyamide-based resin expanded sheet 1, and at the same time, the air existing in the fiber-reinforced resin material 21 was suction-removed.

Then, a pressure in the autoclave was increased to a gauge pressure of 0.3 MPa to apply a pressing force to the laminate B, and at the same time, a temperature in the autoclave was raised to 130° C. at a temperature raising rate of 4° C./min to make a temperature in the autoclave 130° C., thereby, the laminate B was heated for 60 minutes, the thermosetting resin in the fiber-reinforced resin material 21 was cured, and at the same time, fiber-reinforced resin materials 21, 21 were integrally laminated on both sides of the polyamide-based resin expanded sheet 1 with the cured thermosetting resin to obtain a resin composite A. Fiber-reinforced resin materials 21, 21 were integrated by curing of the thermosetting resin contained therein to form a fiber-reinforced resin layer 2 on a surface of the polyamide-based resin expanded sheet 1. In addition, by applying a pressure to the laminate B, an extra thermosetting resin in the fiber-reinforced resin materials 21,21 was absorbed in the blazer cloth 4 through a through pore of the release film 3.

Thereafter, the interior of the autoclave was cooled, and at the time at which a temperature in the autoclave became 60° C., pressurizing in the autoclave was released to return the pressure to the atmospheric pressure, and the resin composite A was taken out. At that time, an expanded layer in the resin composite was compressed from 2.2 mm being an original thickness of the expanded sheet 1, into 1.5 mm.

Like this, in the resin composite A of Example 1, the fiber-reinforced resin layers 2,2 are integrally laminated on both sides of the polyamide-based resin expanded sheet 1.

Example 2

In the same manner as in Example 1 except that as the polyamide-based resin expanded sheet 1, an extrusion-expanded sheet made of polyamide 6 (manufactured by UNITIKA LTD., UNITIKA Nylon 6 A1030BRT), having a thickness of 1.1 mm, an average cell diameter of 280 μm, a contact angle of 65.7°, and an apparent density of 0.24 g/cm$^3$ was used, a resin composite was prepared.

At that time, the expanded layer in the integrated composite was compressed from 1.1 mm being an original thickness of the expanded sheet 1, into 0.75 mm.

Example 3

Figure 6:
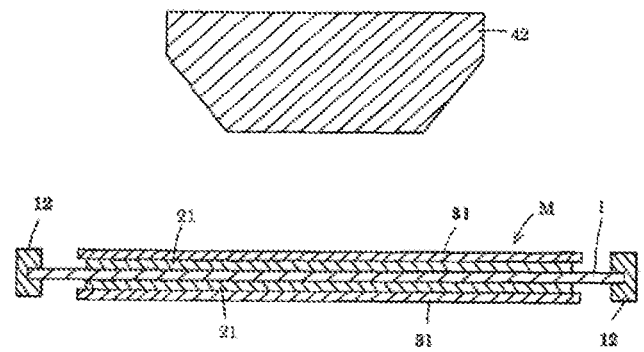
FIG. 6 is a schematic view showing a state where a laminate is disposed between female and male dies.

First, as shown in FIG. 6, a fiber-reinforced resin material 21 was laminated on a lower surface of a polyamide-based resin expanded sheet 1.

Herein, as the polyamide-based resin expanded sheet 1, the expanded sheet used in Example 1 was used.

Additionally, a shape of the polyamide-based resin expanded sheet 1 was a planar square shape of longitudinal 350 mm×transverse 350 mm.

Additionally, as the fiber-reinforced resin material 21, a fiber-reinforced resin material containing 40% by mass of an uncured epoxy resin (glass transition temperature: 121° C.) as a thermosetting resin in a fiber substrate formed of a woven fabric of twill weave composed of a carbon fiber (manufactured by Mitsubishi Rayon Co., Ltd., product name "PYROFIL Prepreg TR3523-395GMP"; weight per unit area: 200 g/m$^2$; thickness: 0.23 mm) was used. A shape of the fiber-reinforced resin material 21 was a planar square shape of longitudinal 250 mm×transverse 250 mm. Two fiber-reinforced resin materials were overlapped so that an angle formed by length directions of warp yarns thereof became 90°. Additionally, the two fiber-reinforced resin materials were integrated with an epoxy resin contained therein.

Besides from the above, the two fiber-reinforced resin materials same as those described above were prepared, and the two fiber-reinforced resin materials were overlapped with the same outline as that described above, to integrate them. This integrated two fiber-reinforced resin materials 21 were laminated on an upper surface of the polyamide-based resin expanded sheet 1.

Like this, the fiber-reinforced resin materials 21 were laminated on both sides of the polyamide-based resin expanded sheet 1 to obtain a laminate. This laminate was crimped [559±196 Pa (5.7±2 gf/cm$^2$)] with a weight of only equipment for crimping, using the equipment for crimping (manufactured by ISHIZAKI ELECTRIC MFG. CO., LTD.; product name "Sure Shot Iron SI-39S"; equipment mass 860 g) at a crimping surface temperature of the equipment for crimping of 18±3° C., and the fiber-reinforced resin material 21 was provisionally adhered on both sides of the polyamide-based resin expanded sheet 1, with an epoxy resin contained in the fiber-reinforced resin material 21. Then, a mold release film 3 (manufactured by KURABO INDUSTRIES LTD.: product name "Oidys"; special polystyrene-based resin film; thickness 50 μm) was further laminated on both surfaces of the provisionally adhered laminate to manufacture a laminate M (lamination step).

Then, the polyamide-based resin expanded sheet 1 of the laminate M was held using a clamp 12 at edges of opposite two sides thereof. In addition, the fiber-reinforced resin material 21 was not held at all.

Thereafter, the laminate M was heated for 5 seconds so that a surface temperature of the fiber-reinforced resin material 21 thereof became 150° C., to soften an uncured epoxy resin impregnated in the fiber-reinforced resin material 21 to be brought into a state having flowability without being cured. In this state, provisional adhesion between the polyamide-based resin expanded sheet 1 and the fiber-reinforced resin material 21 is completely released, and the fiber-reinforced resin material 21 is in a state where it can be easily moved on the polyamide-based resin expanded sheet 1.

Figure 7:
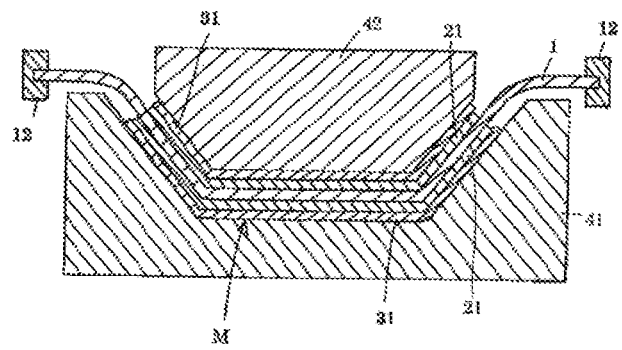
FIG. 7 is a schematic view showing a state where a laminate is press-molded with female and male dies.

Subsequently, as shown in FIG. 6 and FIG. 7, the above-described laminate M was disposed between female and male dies 41,42, and the female and male dies 41,42 were clamped for 1 minute to perform press molding. At that time, after clamping of the female and male dies, the clearance was set to be 2.5 mm. By this press molding, the polyamide-based resin expanded sheet 1 of the laminate M was molded into a desired shape, and at the same time, the fiber-reinforced resin material 21 was molded into a desired shape while it was sliding on the polyamide-based resin expanded sheet 1. At press molding, heating was performed so that a surface temperature of the fiber-reinforced resin material 21 of the laminate M became 140° C., and was controlled so that an epoxy resin contained in the fiber-reinforced resin material 21 retained flowability.

Then, the laminate M was heated for 5 minutes so that a surface temperature of the fiber-reinforced resin material 21 became 140° C., to cure an uncured epoxy resin contained in the fiber-reinforced resin material 21, thereby, bond reinforcing fibers of the fiber-reinforced resin material 21 together with a cured epoxy resin to prepare the fiber-reinforced resin material 21 into a fiber-reinforced resin layer 2, and this fiber-reinforced resin layer 2 was adhered on both sides of the polyamide-based resin expanded sheet 1 with a cured epoxy resin to manufacture a resin composite A (curing step).

Figure 8:
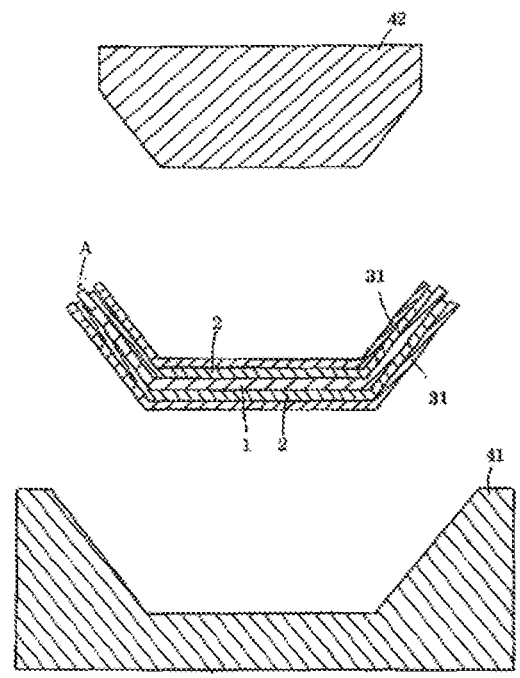
FIG. 8 is a schematic view showing a state where female and male dies are opened, a resin composite is taken out, and both ends of a polyamide-based resin expanded sheet are excised.

Thereafter, after the resin composite A was cooled so that a surface temperature of the fiber-reinforced resin layer 2 thereof became 30° C. or lower, as shown in FIG. 8, the female and male dies 41,42 were opened to obtain a resin composite A. In the resulting resin composite A, the reinforcing fibers were bonded together with a cured epoxy resin, and the fiber-reinforced rein layer 2 molded into a desired shape along female and male dies 41,42 was in a state where it was totally adhered closely along a surface of the polyamide-based resin expanded sheet 1.

Example 4

First, a one-shot molding machine for thermally molding an expanded sheet was prepared.

The one-shot molding machine comprises a heating furnace provided with vertically opposite a pair of far infrared heaters, and a pressing machine equipped with a φ 250 mm air cylinder.

The pressing machine is configured such that a die for thermal molding can be mounted, and the die can be opened and closed up and down with the air cylinder.

The one-shot molding machine is configured such that the heating furnace, and a die mounted in the pressing machine are adjacent in a horizontal direction, and further comprises a mold form which supports a sheet material to be thermally molded in a horizontal direction and reciprocates between the heating furnace and the die.

A die for molding a plate (250 mm square) was set in the pressing machine, a heater temperature of the heating furnace was set at 380° C. and a temperature in the heating furnace was raised. Then, as a fiber-reinforced resin material containing a polyamide 6 resin, a carbon fiber-reinforced thermoplastic prepreg (manufactured by ICHIMURA SANGYO CO., LTD., CF-SS PA6-3KT2A) was prepared, and a polyamide-based resin expanded sheet 1 was cut into 35 cm square, respectively, as in Example 3, and the polyamide-based resin expanded sheet 1 was brought into a state where it was held with the two carbon fiber-reinforced thermoplastic prepregs to prepare a laminate. This laminate was set into a mold form of the one-shot molding machine, the laminate together with the mold form was inserted into the heating furnace, heated in the furnace for 70 seconds, and taken out, and the heated laminate was immediately pressed with the set die from above and below, and retained for 60 seconds, to obtain a plate-likely molded resin composite. At this time, ambient temperatures of an upper part and a lower part in the heating furnace of the one-shot molding machine were 310° C. at the upper part and 290° C. at the lower part. Additionally, 6 kgf/cm$^2$ of compressed air was supplied to the air cylinder of the pressing machine. When a surface temperature of the laminate after heating was measured with "THERMO-LABEL 5E-170" (product name) manufactured by NiGK Corporation, the label discolored to black up to 200° C. That is, it could be confirmed that a temperature for heating the laminate in the heating furnace was 200° C. or higher and 210° C. or lower. When the fiber-reinforced resin layer 2 and the polyamide-based resin expanded sheet 1 of the resulting resin composite were peeled, an interface on the expanded sheet side caused material failure. From this, it could be confirmed that in the resulting resin composite, the fiber-reinforced resin layer 2 and the polyamide-based resin expanded sheet 1 adhered firmly to each other.

Example 5

In the same manner as in Example 4 except that, as the fiber-reinforced resin material containing a polyamide 6 resin, a glass fiber-reinforced thermoplastic prepreg (manufactured by BOND LAMINATES, TEPEX Dynalite 102-FG290(2)/45%) was used, a laminate was prepared. As in Example 4, this laminate was set in a mold form of the one-shot molding machine, the laminate together with the mold form was inserted into a heating furnace, heated in the furnace for 80 seconds, and taken out, and the heated laminate was pressed with the set die from above and below, and retained for 40 seconds to obtain a plate-likely molded resin composite. At this time, ambient temperatures of an upper part and a lower part in the heating furnace of the one-shot molding machine were 310° C. at the upper part and 2900° C. at the lower part. Additionally, 6 kgf/cm$^2$ of compressed air was supplied to the air cylinder of the pressing machine. When a surface temperature of the laminate after heating was measured with "THERMO LABEL 5E-210" (product name) manufactured by NiGK Corporation, the label discolored to black up to 210° C. That is, it could be confirmed that a heating temperature of the laminate in the heating furnace was 210° C. or higher and 220° C. or lower. When the fiber-reinforced resin layer 2 and the polyamide-based resin expanded sheet 1 of the resulting resin composite were peeled, an interface on the expanded sheet side caused material failure. From this, it could be confirmed that, in the resulting resin composite, the fiber-reinforced resin layer 2 and the polyamide-based resin expanded sheet 1 adhered firmly to each other.

Example 6

In the same manner as in Example 5 except that, as the polyamide-based resin expanded sheet 1, an extrusion-expanded sheet made of polyamide 66 (manufactured by UNITIKA LTD.; UNITIKA Nylon 66 E2046), having a thickness of 2.3 mm, an average cell diameter of 350 m, a contact angle of 70.4°, and an apparent density of 0.21 g/cm$^3$ was used, a laminate was prepared. As in Example 5, this laminate was set in the mold form of the one-shot molding machine, the laminate together with the mold form was inserted into the heating furnace, heated in the furnace for 100 seconds, and taken out, and the heated laminate was immediately pressed with the set die from above and below, and retained for 40 seconds to obtain a plate-likely molded resin composite. At this time, ambient temperatures of an upper part and a lower part in the heating furnace of the one-shot molding machine were 310° C. at the upper part and 290° C. at the lower part. Additionally, 6 kgf/cm$^2$ of compressed air was supplied to the air cylinder of the pressing machine. When a surface temperature of the laminate after heating was measured with "THERMO LABEL 5E-210" (product name) manufactured by NiGK Corporation, the label discolored to black up to 240° C. That is, it could be confirmed that a heating temperature of the laminate in the heating furnace was 240° C. or higher and 250° C. or lower. When the fiber-reinforced resin layer 2 and the polyamide-based resin expanded sheet 1 of the resulting resin composite were peeled, an interface on the expanded sheet side caused material failure. From this, it could be confirmed that, in the resulting resin composite, the fiber-reinforced resin layer 2 and the polyamide-based resin expanded sheet 1 adhered firmly to each other.

Example 7

First, a hot plate molding machine for thermal molding an expanded sheet was prepared.

The hot plate molding machine comprises a heating zone in which vertically opposing 250 mm square tabular heating plates are disposed, and a molding zone with a molding cavity attached thereto. The hot plate molding machine is configured such that the heating plates can be opened and closed with a φ 125 mm air cylinder in upper and lower directions. The hot plate molding machine is configured such that the molding cavity can be opened and closed with a φ 125 mm air cylinder in upper and lower directions. Additionally, the hot plate molding machine is configured such that the heating zone and the molding zone are adjacent in a horizontal direction, and further comprises a mold form which supports a sheet material to be thermally molded in a horizontal direction, and reciprocates between the heating plate and the molding cavity.

As the molding cavity, a die for matched molding was prepared.

The molding cavity is such that when a male die and a female die are closed, a deep dish-shaped space is formed in the interior thereof, and is for preparing a deep dish.

A deep dish prepared by the molding cavity has a rib on a side wall part, and the external dimension of an opening of the dish is 114 mm×175 mm, the external dimension of a bottom is 80 mm×125 mm, and the depth (external dimension) is 26 mm.

In addition, the dimensions of an opening and a bottom of the dish are values including a rib.

The molding cavity was set in the molding zone, and at the same time, the heating plate was heated to 230° C.

Then, after the resin composite obtained in Example 4 was set in the mold form of the hot plate molding machine, the resin composite together with the mold form was inserted into the heating zone, held with the heating plate from above and below for 60 seconds, and heated, thereafter, the heating plate was opened up and down, the mold form was immediately transferred to the molding zone, and the heated resin composite was pressed with the set molding cavity from above and below to retain for 60 seconds, to obtain a resin composite with a deep dish shape imparted thereto.

At this time, 4 kgf/cm² of compressed air was supplied to the air cylinder of the hot plate molding machine.

Like this, it could be confirmed that, by using the thermoplastic resin in the fiber-reinforced resin material, after a resin composite is formed once, it can be heated again to be processed into another shape.

(Evaluation)

Concerning the resin expanded sheet 1 of the resulting resin composite A, tensile elongation at break was measured, and the result together with an average cell diameter, a thickness and an apparent density are shown in Table 1.

Concerning the fiber-reinforced resin layer 2 of the resulting resin composite A, the content and a thickness of the reinforcing fiber together with physical properties (the number of times of lamination, kind of resin, lamination direction) of the fiber-reinforced resin material 21 are shown in Tables 2 and 3.

Concerning the resulting resin composite A, a thickness, an apparent density, the maximum point energy and the specific absorption energy were measured, and the result thereof is shown in Table 4. In addition, an apparent density of the resin composite A was measured in accordance with JIS K7222. Additionally, the maximum point energy and the specific absorption energy were measured with the outline of the following.

[Maximum Point Energy and Specific Absorption Energy]

Five test pieces having a planar rectangular shape of longitudinal 25 mm×transverse 150 mm were cut out from the resin composite. Concerning each test piece, properties other than the dimension of the test piece were measured in accordance with JIS K7221-1:2006 "Rigid Cellular Plastics—Determination of Flexural Properties—Part 1: Basic Bending Test". That is, after the test pieces were maintained for 16 hours or longer under the atmosphere of temperature 23±2° C. and humility 50±5%, measurement was performed under the environment of temperature 23±2° C. and humility 50±5%. Using a tensilon universal testing machine (manufactured by ORIENTEC CORPORATION, product name "UCT-10T") and universal testing machine data processing software (manufactured by SOFTBRAIN Co., Ltd., product name "UTPS-237S"), measurement was performed at a pressurizing rate of 10 mm/min, pressurizing wedge 5R (radius of curvature of tip 5 mm), and support table 5R (radius of curvature of tip 5 mm) and under a span of 100 mm. The number of test pieces was 5.

The specific absorption energy was defined as a value obtained by dividing the maximum point energy by a test piece mass. An arithmetic average value of each of the maximum point energy and the specific absorption energy of each test piece was adopted as the maximum point energy and the specific absorption energy. The maximum point energy becomes an index of impact resistance, and as the maximum point energy is greater, impact resistance is more excellent.

TABLE 1

| | Polyamide-based resin expanded sheet | | | | |
|---|---|---|---|---|---|
| | Apparent density (g/cm³) | Average cell diameter (μm) | Thickness (mm) | Tensile elongation at break (%) | Contact angle (°) |
| Examples 1, 3, 4, 5 | 0.25 | 390 | 2.2 | 111 | 68.6 |
| Example 2 | 0.24 | 280 | 1.1 | 117 | 65.7 |
| Example 6 | 0.21 | 350 | 2.3 | 85 | 70.4 |

TABLE 2

| | Fiber-reinforced resin material | | | | |
|---|---|---|---|---|---|
| | Number of times of lamination (Number of sheets) | Resin | Lamination direction | Fiber-reinforced resin layer | |
| | | | | Content of reinforcing fiber (% by mass) | Thickness (mm) |
| Example 1 | 4 | Thermosetting epoxy resin | 0°/90° | 60 | 0.8 |
| Example 2 | 4 | Thermosetting epoxy resin | 0°/90° | 60 | 0.8 |
| Example 3 | 4 | Thermosetting epoxy resin | 0°/90° | 60 | 0.8 |

TABLE 3

| | Fiber-reinforced resin material | | | | |
|---|---|---|---|---|---|
| | Number of times of lamination (Number of sheets) | Resin | Reinforcing fiber | Fiber-reinforced resin layer | |
| | | | | Content of reinforcing fiber (% by volume) | Thickness (mm) |
| Example 4 | 1 | Polyamide 6 | Carbon fiber | 45 | 0.45 |
| Examples 5, 6 | 1 | Polyamide 6 | Glass fiber | 45 | 0.5 |

TABLE 4

| | Resin composite | | | | | |
|---|---|---|---|---|---|---|
| | Thickness (mm) | Apparent density (g/cm$^3$) | Maximum point load (N) | Maximum point energy (J) | Specific load (N/g) | Specific absorption energy (J/g) |
| Example 1 | 2.30 | 0.70 | 100.6 | 1.13 | 16.1 | 0.18 |
| Example 2 | 1.55 | 0.96 | 65.9 | 1.34 | 13.5 | 0.28 |
| Example 3 | 2.50 | 0.72 | 113.7 | 1.21 | 16.2 | 0.17 |
| Example 4 | 3.0 | 0.66 | 120.5 | 0.53 | 15.0 | 0.07 |
| Example 5 | 2.1 | 1.05 | 98.5 | 0.76 | 15.3 | 0.11 |
| Example 6 | 3.2 | 0.72 | 113.0 | 0.30 | 16.4 | 0.04 |

From the forgoing, it is seen that the resin composites A of Examples 1 to 6 are excellent in impact resistance, by having the polyamide-based resin expanded sheet 1, and the fiber-reinforced resin layer 2 which has been integrally laminated on both sides of the polyamide-based resin expanded sheet 1.

DESCRIPTION OF THE REFERENCE NUMBERS

1 Polyamide-based resin expanded sheet
2 Fiber-reinforced resin layer
3 Release film
4 Blazer cloth
5 Bagging film
6a, 6b Pressing plate
7 Sealing material
8 Space part
11 Back valve
12 Clamp
21 Fiber-reinforced resin material
31 Mold release film
41, 42 Male and female dies
A Resin composite
B, M Laminate

What is claimed is:

1. A resin composite comprising:
    a polyamide-based resin expanded sheet; and
    a fiber-reinforced resin layer laminated on a surface of said polyamide-based resin expanded sheet,
    wherein:
    said fiber-reinforced resin layer and said polyamide-based resin expanded sheet are integrated with each other,
    said polyamide-based resin expanded sheet is an extrusion-expanded sheet having an average cell diameter of 10 μm or more and 1,000 μm or less, a tensile elongation at break of 80% or more and 150% or less, and a contact angle of 30° or more and 90° or less,
    said polyamide-based resin expanded sheet comprises a crosslinking agent in an amount of 0.05% by mass or more and 10% by mass or less, and
    a crystallization degree of the polyamide-based resin contained in the polyamide-based resin expanded sheet is 10% or more.

2. The resin composite according to claim 1, wherein said polyamide-based resin expanded sheet has a thickness of 0.1 mm or more and 5 mm or less.

3. The resin composite according to claim 1, wherein said polyamide-based resin expanded sheet has an apparent density of 0.1 g/cm$^3$ or more and 1.1 g/cm$^3$ or less.

4. The resin composite according to claim 1, wherein a content of a reinforcing fiber in said fiber-reinforcing resin layer is 30% by mass or more and 80% by mass or less.

5. The resin composite according to claim 1, which has an apparent density of 0.3 g/cm$^3$ or more and 1.5 g/cm$^3$ or less.

* * * * *